United States Patent [19]

Sauer et al.

[11] Patent Number: 4,915,509
[45] Date of Patent: Apr. 10, 1990

[54] MIXER FOR MIXING AT LEAST TWO FREE-FLOWING SUBSTANCES, ESPECIALLY THOSE WHICH REACT DURING MIXING

[75] Inventors: Heinz Sauer; Hermann Dallmeyer, both of Odenthal; Uwe J. Zarnack, Brunsbuettel; Berthold Keggenhoff; Bernd Weber, both of Krefeld, all of Fed. Rep. of Germany

[73] Assignee: Bayer Aktiengesellschaft, Bayerwerk, Fed. Rep. of Germany

[21] Appl. No.: 190,580

[22] Filed: May 5, 1988

[30] Foreign Application Priority Data

May 21, 1987 [DE] Fed. Rep. of Germany ....... 3717058

[51] Int. Cl.⁴ .............................................. B01F 5/06
[52] U.S. Cl. .................................... 366/171; 366/172; 366/177; 366/262; 366/304; 366/307; 366/317; 415/143; 415/199.1
[58] Field of Search ............................. 366/66, 97–99, 366/167–173, 177, 178, 262–265, 270, 290, 292, 293, 295, 303–305, 306, 307, 315–317; 422/224, 225, 228; 415/143, 199.1, 198.1; 560/347

[56] References Cited

U.S. PATENT DOCUMENTS

| | | | |
|---|---|---|---|
| 2,206,633 | 7/1940 | Ditto . | |
| 2,395,704 | 2/1946 | Wislicenus | 415/198.1 |
| 2,960,318 | 11/1960 | Caillaud | 366/305 X |
| 3,081,069 | 3/1963 | Oakes | 366/304 X |
| 3,251,577 | 5/1966 | Bolanowski et al. | 366/304 |
| 3,321,283 | 5/1967 | Ewald | 23/283 |
| 3,924,963 | 12/1975 | Zerrer | 415/143 |
| 3,947,484 | 3/1976 | Mitrowsky et al. | 260/453 |
| 3,995,838 | 12/1976 | Zucker | 366/304 X |
| 3,996,012 | 12/1976 | Zucker . | |
| 4,092,738 | 5/1978 | Doom | 366/262 |
| 4,175,873 | 11/1979 | Iwako et al. | 366/165 |
| 4,289,732 | 9/1981 | Bauer et al. | 422/224 |
| 4,390,317 | 6/1983 | Lehmann et al. | 415/199.1 |
| 4,419,295 | 12/1983 | Hennig et al. | 260/453 |
| 4,541,724 | 9/1985 | Cornelissen | 366/293 |
| 4,726,734 | 2/1988 | Zientek et al. | 415/143 |
| 4,792,278 | 12/1988 | Emerson | 415/143 |

FOREIGN PATENT DOCUMENTS

| | | |
|---|---|---|
| 1238669 | 7/1971 | United Kingdom . |
| 2027808 | 2/1980 | United Kingdom ............... 415/143 |
| 2169814 | 1/1986 | United Kingdom . |

OTHER PUBLICATIONS (1) Product Information Bulletin on Votator CR Mixer, Date unknown.
(4) Product Information Bulletin for Continuous Agitation Bead Mill, Date unknown.
(5) Commercial Mixing Device-Diagram, Date unknown.

Primary Examiner—Timothy F. Simone
Attorney, Agent, or Firm—Gene Harsh; Joseph C. Gil; Thomas W. Roy

[57] ABSTRACT

The present invention is directed to a mixer for mixing at least two free-flowing, reactive or unreactive substances comprising
(a) a casing having at least two inlets and at least one outlet,
(b) a rotatable shaft extending through the casing,
(c) at least one rotor disc attached to the shaft such that the rotor disc is perpendicular to the shaft,
(d) at least one stator disc attached to the casing such that the stator disc is parallel to the rotor disc and has an opening such that shaft can pass through the stator disc,
(e) optionally at least one running wheel attached to the shaft and containing openings such that when the shaft is rotating, the running wheel provides a pumping effect to the mixture passing through the mixer,
(f) at least one inlet through the casing for introducing a first substance axially to the shaft and against the rotor disc and
(g) at least one inlet for introducing a second substance against a rotor disc at a point which is radially outward from the introduction of the first substance.

8 Claims, 1 Drawing Sheet

MIXER FOR MIXING AT LEAST TWO FREE-FLOWING SUBSTANCES, ESPECIALLY THOSE WHICH REACT DURING MIXING

BACKGROUND OF THE INVENTION

1. Field of the Invention

The present invention relates to a mixer for mixing at least two free-flowing substances, especially those which react during mixing.

2. Description of the Prior Art

It is known to mix free-flowing components for the purpose of conversion by means of a centrifugal pump (DE-PS No. 21 53 268 corresponding to U.S. Pat. No. 3,947,484), wherein one of the components is applied laterally to the first, e.g., the second component is applied laterally between the first and second rotor disc of a centrifugal pump. It has been shown that clumps, cakes and blockages form in such a centrifugal pump if the components are converted into a solid matter suspension, for example during the phosgenation of primary amines.

Accordingly, it is an object of the present invention to provide a mixer which mixes substances together without clumping and which also converts free-flowing reactive components into solid matter suspensions or comparable products free of clumps, cakes and blockages. This object is achieved in accordance with the present invention as described hereinafter.

SUMMARY OF THE INVENTION

The present invention is directed to a mixer for mixing at least two free-flowing, reactive or unreactive substances comprising
   (a) a casing having at least two inlets and at least one outlet,
   (b) a rotatable shaft extending through the casing,
   (c) at least one rotor disc attached to the shaft such that the rotor disc is perpendicular to the shaft,
   (d) at least one stator disc attached to the casing such that the stator disc is parallel to the rotor disc and has an opening such that shaft can pass through the stator disc,
   (e) optionally at least one running wheel attached to the shaft and containing openings such that when the shaft is rotating, the running wheel provides a pumping effect to the mixture passing through the mixer,
   (f) at least one inlet through the casing for introducing a first substance axially to the shaft and against the rotor disc and
   (g) at least one inlet for introducing a second substance against a rotor disc at a point which is radially outward from the introduction of the first substance.

DETAILED DESCRIPTION OF THE INVENTION

In accordance with the present invention the axially conveyed stream, which is evenly distributed at the rotor disc must stream radially outwards such that it is admixed with the additional substance conveyed. A mixed film results which flows through the cleft between rotor disc and inner side of the casing. Because hardly any back-mixing can take place in a mixer arranged in this manner, the residence time spectrum is advantageously very narrow. As a result, the danger of forming clumps is extraordinarily low.

The inlet for the additional substance is preferably developed as a nozzle such that the second substance is injected into the first. A local whirling takes place, which increases the quality of mixing but does not detrimentally influence the residence time spectrum.

According to a further special embodiment, several inlets for the further substance are arranged to inject this material against the rotor disc at several points. The inlets or the inlets formed as nozzles are preferably arranged at regular angles, e.g., 90°, to improve the flow and mixing conditions.

The front surface of the shaft facing the inlet of the first substance is preferably tapered. The radially outward movement of the first substance is thereby improved. Increased smoothness in the transition from the tapered shaft to the rotor disc is favorable to the movement of the first substance.

According to a further special embodiment, the rotor discs and/or stator discs have stirring elements. Such stirring elements provide good quality mixing, especially at high throughput rates. Rods placed on the discs or rings concentric with the axis of rotation, preferably provided with holes, are suitable for this. However, stirring can also be achieved simply with holes in the discs themselves, preferably in the form of slits or notches. Any symmetric body, which is manufactured out of a disc by means of notches and/or attachments, is included within the scope of the invention.

Figure 1:
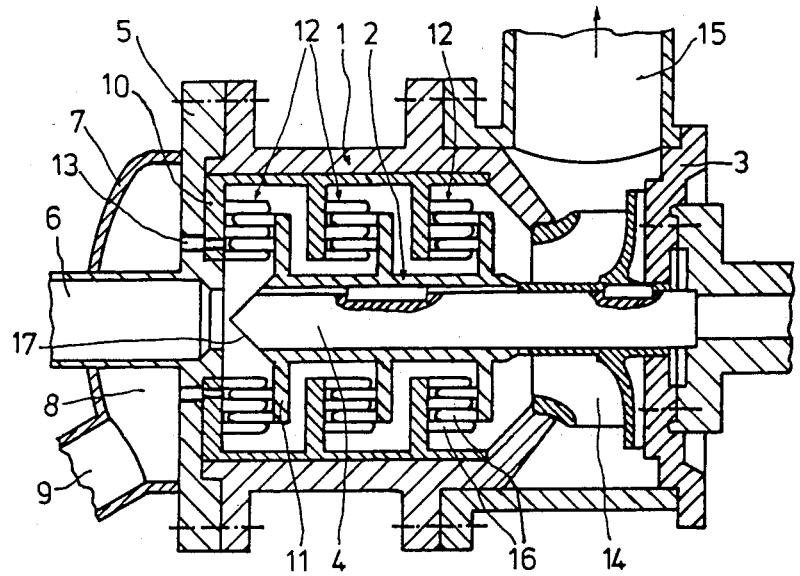

According to a further advantageous development, the stator discs and/or the rotor discs comprise, meshing collars as shown in FIG. 1. Intensive mixing of the two substances takes place in such a stator disc/rotor disc unit. In so far as the stirring elements are formed and arranged in a manner favorable to streaming no stream-free points develop.

According to another special embodiment, the first stator disc is formed out of the front wall of the casing and provided with the inlets, or, equivalent to this, the first stator disc is arranged on the inner side of the front wall of the casing.

The inlets must penetrate the stator disc. If no stirring elements are provided on the first stator disc, then it has no particular significance, i.e. it could be dispensed with in this special case.

A running wheel is preferably arranged between stator disc/rotor disc units and/or before the outlet. The running wheel assists in transporting the materials through or away from the mixer and in providing a narrow residence time spectrum. Such running wheels are generally arranged on the same shaft as the rotor disc and contain several openings which extend through the wheel. An additional stator is preferably provided before each running wheel to force the product through the openings in the running wheel. As the shaft rotates the running wheel provides a pumping action to the reaction mixture to propel it through or away from the mixer.

It is necessary, especially at high throughput rates, to arrange several stator disc/rotor disc units in series, so that sufficient time is available for mixing and, if necessary, reaction of the components.

With several stator disc/rotor disc units, it is advantageous to arrange at least one running wheel between the stator disc/rotor disc units. This measure too serves to improve the pumping action.

Finally, it is possible to provide the casing with a tempering jacket. Depending on requirements, heat can thereby be introduced or withdrawn from the mixer.

If the substances or the reaction product are toxic, the mixer is hermetically sealed. This is especially true of the shaft. A magnetic coupling provided with a split tube or a split top is especially suitable for the driving power.

The choice of construction material for the mixer depends on the characteristics of the substances to be mixed or reacted.

In order to obtain as little back-mixing as possible, the mixer is symmetrically arranged. The residence time may be influenced especially by the shape of the stator discs and rotor discs, their separation from each other, the clearance between the rotor discs and the casing and the clearance between the stator discs and the shaft. The running wheels are also symmetrically formed. The rotation number of the rotor is between about 200 and 10,000 $min^{-1}$, preferably between about 1,000 and 8,000 $min^{-1}$.

The mixer of the present invention is suitable inter alia for the phosgenation of mono- and/or polyamines as disclosed in copending application, Ser. No. 190555 filed May 5, 1988.

In the drawing the mixer is represented in sectional views schematically in two embodiments and subsequently more fully described.

Figure 2:
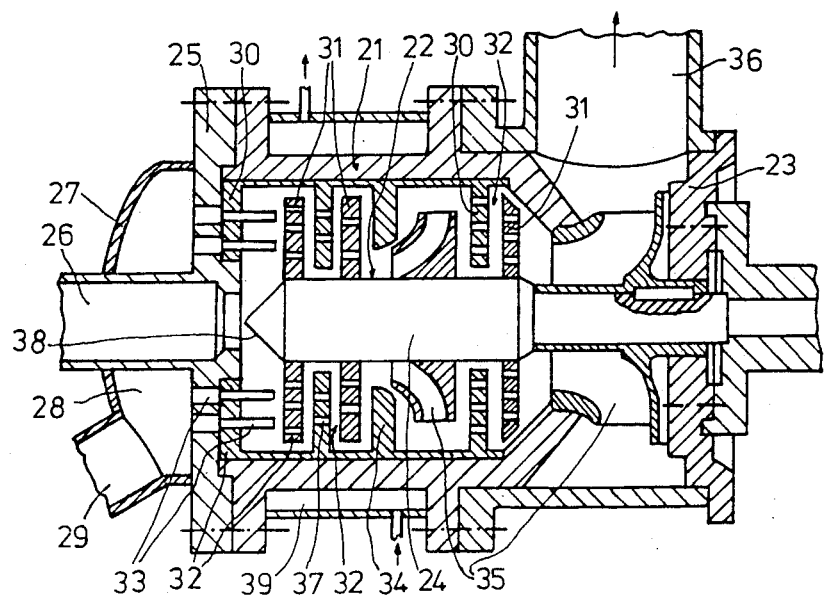

FIG. 1 shows a mixer with stirring elements on the stator discs and the rotor discs and FIG. 2 shows a mixer with two running wheels.

In FIG. 1, the mixer is made up of a casing 1 and a rotor 2. The shaft 4 of the rotor 2 extends into a wall 3 and is hermetically sealed to the outside. The drive takes place across a magnetic coupling (not represented). Front wall 5 is provided with a supply connecting piece or inlet 6 for conveying a first substance. A hood 7 is arranged on the outside of front wall 5, so that a chamber 8 is formed. A feeder 9 for a second substance joins into chamber 8. A stator disc 10 is arranged at the inner side of front wall 5, which, together with a first rotor disc 11 arranged on the shaft 4, forms a first unit 12. Nozzles 13 project from chamber 8 through front wall 5 and stator disc 10 and join directly in front of rotor disc 11. Casing 1 encloses two more similarly constructed stator disc/rotor disc units 12, which are arranged in series. The casing tapers after the last unit 12 to a running wheel 14. A connecting piece 15 is provided in proximity to running wheel 14. Both stator discs 10 and rotor discs 11 are provided with rods as stirring elements 16, which are arranged in the shape of concentric, meshing collars. The front surface 17 of shaft 4 tapers towards inlet 6.

In FIG. 2, the mixer is based on a casing 21 and a rotor 22. The shaft 24 of rotor 22 extends into wall 23 and is hermetically sealed off to the outside. The drive takes place across a magnetic coupling (not represented). Front wall 25 is provided axially to shaft 24 with a feeder connecting piece or inlet 26 for the first substance. A hood 27 is arranged on the outside of front wall 25, forming a chamber 28. A feeder 29 for a second substance joins into chamber 28. A stator disc 30 is arranged on the inner side of front wall 25, forming a chamber 28. A feeder 29 for a second substance joins into chamber 28. A stator disc 30 is arranged on the inner side of front wall 25, forming a unit 32 with a first rotor disc 31 arranged on shaft 24. Feed nozzles 33 project out of chamber 28 through the front wall 25 and stator disc 30 and lead directly in front of rotor disc 31. Two more stator disc/rotor disc units 32 are provided, wherein an additional stator disc 34 and a first running wheel 35 are provided between the second and third unit 32. The casing 21 tapers behind the third unit 32 up to a second running wheel 35. A conveying connecting piece 36 leads out from casing 21. First stator disc 30 serves in the present embodiment for the admittance of nozzles 33, while further stator discs 30 and rotor discs 31 have slits as stirring elements 37. The front surface 38 of shaft 24 is tapered towards inlet 26. The casing 21 is provided with a tempering jacket 39.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixer for mixing at least two free-flowing, reactive or unreactive substances comprising
   (a) a casing having at least two inlets and at least one outlet,
   (b) a rotatable shaft extending through said casing,
   (c) at least one rotor disc attached to said shaft such that said rotor disc is perpendicular to said shaft,
   (d) at least one stator disc attached to said casing such that said stator disc is parallel to said rotor disc and has an opening such that said shaft can pass through said stator disc,
   (e) at least one running wheel attached to said shaft and containing openings such that when the shaft is rotating, said running wheel provides a pumping effect to the mixture passing through said mixer,
   (f) at least one first inlet through said casing for introducing a first substance axially to said shaft and against said rotor disc and
   (g) at least on second inlet for introducing a second substance against a rotor disc at a point which is radially outward from the introduction of said first substance.

2. The mixer of claim 1 which comprises more than one second inlet.

3. The mixer of claim 1 wherein said second inlet is in the form of a nozzle.

4. The mixer of claim 1 wherein the surface of the shaft pointing towards the inlet is tapered.

5. The mixer of claim 1 wherein said rotor disc and-/or said stator disc have stirring elements.

6. The mixer according to claim 5 wherein said rotor disc and said stator disc have meshing collars formed out of stirring elements.

7. The mixer according to claim 1 wherein the first stator disc is attached to or formed out of the front wall of said casing and wherein said first stator disc has inlets.

8. The mixer according to claim 1 wherein one running wheel precedes the last stator disc/rotor disc unit preceding the outlet.

* * * * *